July 8, 1930.  H. FORDYCE  1,770,072
GARDEN TOOL
Filed Oct. 15, 1928

INVENTOR
H. FORDYCE
BY
ATTORNEY

Patented July 8, 1930

1,770,072

UNITED STATES PATENT OFFICE

HARRIET FORDYCE, OF ST. LOUIS, MISSOURI

GARDEN TOOL

Application filed October 15, 1928. Serial No. 312,678.

This invention relates generally to garden tools and more specifically to an improved hand tool adapted for use in performing simple digging operations in gardens, the predominant object of the invention being to provide an improved tool of this type which is extremely simple in construction and functions in an improved manner over similar tools formerly used.

Figure 1:
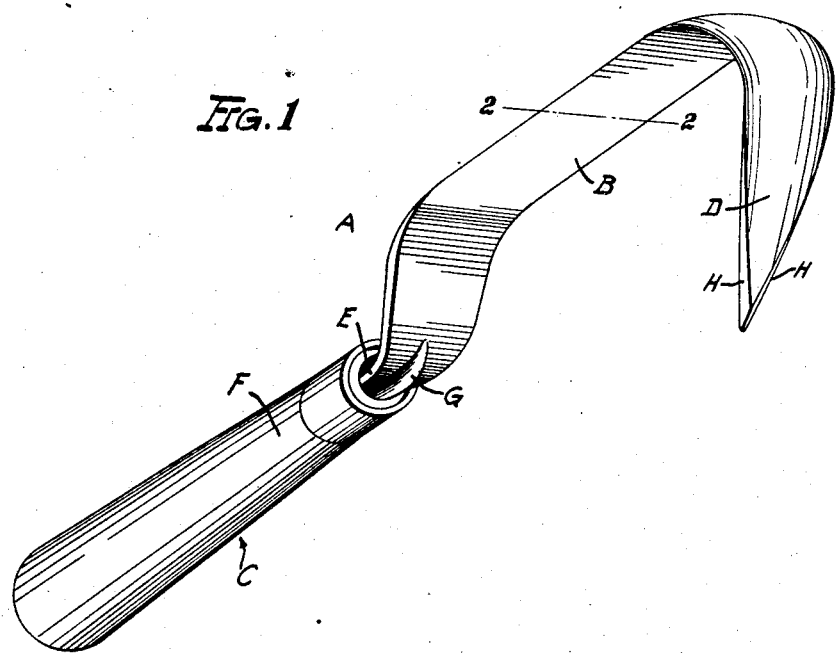
Fig. 1 illustrates a perspective view of a garden tool constructed in accordance with my invention.

In the drawing, wherein is illustrated one embodiment of my invention, A designates my improved garden tool generally, said tool comprising a body portion B, a handle portion C, and a sharpened nose or digging portion D. As will be noted by referring to Fig. 1 of the drawing, the portion of the tool produced by the combined body portion B and digging portion D is approximately U-shaped, and said body portion has a shank E extended therefrom which is extended into a suitable handle F. If desired the shank E may be provided with one or more ribs G to add strength and rigidity to the tool at the handle portion thereof.

The predominant feature of the present invention resides in the fact that the transverse dimension of the portion D of the tool disclosed herein decreases gradually from top to bottom so that said portion tapers to an approximate point and that the side edges of said portion are sharpened to provide cutting edges as designated by the reference character H in Fig. 1 of the drawing. Because of this arrangement the operation of digging in a garden with such a tool as that disclosed herein is made much easier and also precise digging is made possible where the use of a tool having a digging portion shaped as heretofore might do damage to adjacent plants.

Figure 2:
Fig. 2 is a cross section on line 2—2 of Fig. 1.

The element of which the body portion B of the tool is formed in cross section is preferably shaped as illustrated in Fig. 2 for the purpose of giving to said element the necessary strength.

I claim:

A garden digging tool comprising, a handle of a length adapted to receive one hand only of the user of the tool, an approximately U-shaped element with which said handle is associated, said U-shaped element including an elongated digging portion which tapers to an approximate point at the outer end thereof and a flat intermediate portion, said elongated digging portion being provided with beveled cutting edges at the opposite side edges only thereof, said elongated digging portion having a flat inner face and a curved outer face to give the required strength thereto, and said U-shaped element rearwardly of the tapered digging portion being of substantially uniform width throughout to provide a rigid structure.

In testimony that I claim the foregoing I hereunto affix my signature.

HARRIET FORDYCE.